(No Model.)
F. J. HERMAN.
HUB ATTACHING DEVICE.
No. 529,683. Patented Nov. 20, 1894.
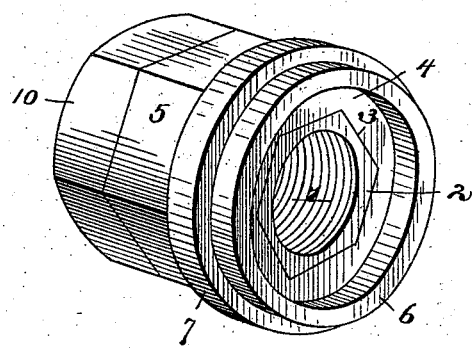
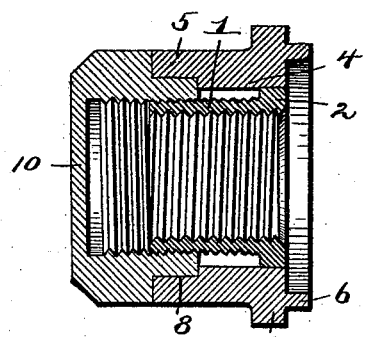
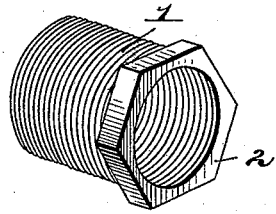
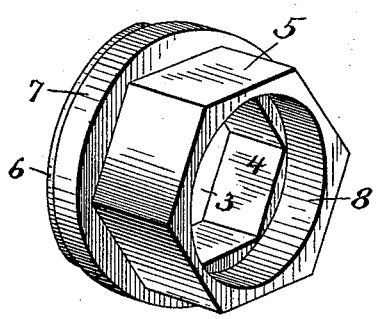
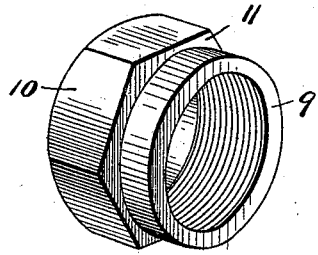
Witnesses
Harry L. Amer.
J. W. Riley
Inventor
Frank J. Herman,
By his Attorneys.
C. A. Snow & Co.

UNITED STATES PATENT OFFICE.

FRANK J. HERMAN, OF NORWALK, OHIO.

HUB-ATTACHING DEVICE.

SPECIFICATION forming part of Letters Patent No. 529,683, dated November 20, 1894.

Application filed July 15, 1893. Renewed September 29, 1894. Serial No. 524,479. (No model.)

*To all whom it may concern:*

Be it known that I, FRANK J. HERMAN, a citizen of the United States, residing at Norwalk, in the county of Huron and State of Ohio, have invented a new and useful Hub-Attaching Device, of which the following is a specification.

The invention relates to improvements in hub attaching devices.

The object of the present invention is to provide a simple and inexpensive device adapted for securing hubs to the spindles of axles, and capable of taking up the wear of the spindle and the axle box, and of preventing the latter moving or shifting longitudinally on the former and causing injury to a wheel.

The invention consists in the construction and novel combination and arrangement of parts hereinafter fully described, illustrated in the accompanying drawings and pointed out in the claim hereto appended.

In the drawings—Figure 1 is a perspective view of a hub attaching device constructed in accordance with this invention. Fig. 2 is a longitudinal sectional view. Fig. 3 is a detail perspective view of the sleeve. Figs. 4 and 5 are similar views of the collar and the nut.

Like numerals of reference indicate corresponding parts in all the figures of the drawings.

1 designates a sleeve, interiorly and exteriorly threaded and provided at its inner end with a polygonal flange 2, adapted to fit a corresponding polygonal opening 3 of a collar 4, which has a polygonal outer portion 5 to receive a wrench, whereby the sleeve is screwed on the threaded extremity of the spindle of an axle. The collar is provided at its inner end with a flange 6 for forming an oil recess or cavity, and it has a circumferential flange or enlargement 7 adjacent to the flange 6. The outer end of the collar is provided with an annular recess 8, which is arranged at the outer extremity of the polygonal opening or bore 3, and which is adapted to receive an annular flange 9 of a cap nut 10 to permit the latter to screw on the exteriorly threaded portion of the sleeve, whereby the collar is advanced on the sleeve to take up the wear of a spindle or the axle box of a hub.

The polygonal bore or opening 3 of the collar extends the greater portion of the length of the latter, to enable the collar to be capable of sufficient advancement on the sleeve to take up all the wear of an axle and axle box. The cap nut is interiorly threaded, and is adapted to screw on the sleeve until its shoulder 11 at the juncture of the flange and the nut proper contact with the collar, when continued screwing of the cap nut advances the collar on the sleeve as will be readily seen. The cap nut covers the outer extremity of the sleeve and forms a perfect dust-cap for excluding dust from the interior of the device. It has its outer surface flush with the outer face of the collar, and these two parts combine in causing the device to present an appearance similar to that of an ordinary axle nut. The device is applied to an axle similar to an ordinary axle nut, and is adapted to be engaged by an ordinary wrench, and in screwing the device tightly in place on an axle, there is no liability of altering the adjustment of the parts, accidentally, as the wrench is applied to the collar, which is rigid with the sleeve, owing to the polygonal flange of the latter.

It will be readily seen that the device is simple and comparatively inexpensive in construction, that it takes the place of the ordinary axle nut, that it excludes dust and that it is capable of readily taking up the wear of a spindle or axle box.

It will also be apparent that as the outer surface of the cap nut is polygonal and conforms to the wrench seat of the collar and forms a continuation thereof, both the cap nut and the collar may be grasped by an ordinary wrench, so that both parts may be turned simultaneously in applying the device to an axle; and the cap nut is also capable of being rotated separately by a wrench to adjust the device.

Changes in the form, proportion, and the minor details of construction may be resorted to without departing from the principle or sacrificing any of the advantages of this invention.

What I claim is—

In a hub attaching device, the combination of a sleeve interiorly and exteriorly threaded, a collar loosely arranged on the inner end of the sleeve and capable of adjustment longitudinally of the same and incapable of independent rotation, said collar having an exterior wrench seat, and a cap nut engaging the exterior threads of the sleeve and covering the outer extremity thereof, and having an outer polygonal surface, conforming to the configuration of the collar, and forming a continuation of the same, whereby both parts are adapted to be turned simultaneously by a wrench in applying the nut to an axle, and independently to adjust the nut, substantially as described.

In testimony that I claim the foregoing as my own I have hereto affixed my signature in the presence of two witnesses.

FRANK J. HERMAN.

Witnesses:
GEO. T. HAYES,
A. J. WARNER.